US006132070A

United States Patent [19]

Vosika et al.

[11] Patent Number: 6,132,070

[45] Date of Patent: *Oct. 17, 2000

[54] SELF-ALIGNING CANOPY STRUCTURE FOR CONNECTION TO A MOUNTING PLATE ADAPTER UTILIZED FOR ATTACHING AN EXIT SIGN TO A JUNCTION BOX

[75] Inventors: David A. Vosika, Cloverdale; Drusilla L. Underwood, Dublin, both of Va.

[73] Assignee: Hubbell Incorporated, Orange, Conn.

[ * ] Notice: This patent is subject to a terminal disclaimer.

[21] Appl. No.: 09/124,774

[22] Filed: Jul. 30, 1998

[51] Int. Cl.[7] .................. B60Q 1/00

[52] U.S. Cl. .................. 362/368; 362/812; 40/570; 439/536

[58] Field of Search .................. 362/147, 226, 362/368, 812; 40/541, 564, 570; 248/906; 439/535, 536

[56] References Cited

U.S. PATENT DOCUMENTS

| | | | |
|---|---|---|---|
| 4,201,005 | 5/1980 | Hunt | 40/570 |
| 4,263,739 | 4/1981 | Lee | 40/606 |
| 4,813,197 | 3/1989 | Teisen-Simony | 52/785 |
| 5,018,290 | 5/1991 | Kozek et al. | 40/570 |
| 5,272,605 | 12/1993 | Johnstone | 362/147 |
| 5,349,513 | 9/1994 | Taylor, III | 362/404 |
| 5,376,020 | 12/1994 | Jones | 439/537 |
| 5,416,679 | 5/1995 | Ruskouski et al. | 362/240 |
| 5,461,550 | 10/1995 | Johnstone | 362/147 |
| 5,768,814 | 6/1998 | Kozek et al. | 40/570 |

*Primary Examiner*—Cassandra Spyrou
*Assistant Examiner*—Mark A. Robinson
*Attorney, Agent, or Firm*—Jerry M. Presson; Leopold Presser

[57] ABSTRACT

A structure for aligning a canopy for an exit sign with a standard wall-mounted electrical junction box. The structure is constituted of a separate plate which is adapted to be fastened to the back cover of an exit sign so as to form a mounting structure adapted for facilitating the attachment of the exit sign to a wall-mounted electrical junction box, and which incorporates slots adapted to be engaged by protuberances on the canopy for aligning the latter with the junction box in predetermined selective orientations.

18 Claims, 10 Drawing Sheets

SELF-ALIGNING CANOPY STRUCTURE FOR CONNECTION TO A MOUNTING PLATE ADAPTER UTILIZED FOR ATTACHING AN EXIT SIGN TO A JUNCTION BOX

BACKGROUND OF THE INVENTION

1. Field of the Invention

The present invention relates to a structure for the self-aligning connection of a canopy for an exit sign to a mounting plate adapter for a standard wall-mounted electrical junction box. More particularly, the invention pertains to a structure constituted of a mounting plate which is adapted to be fastened to the back wall of an exit sign back cover so as to form a mounting structure adapted for facilitating the attachment of the exit sign to a wall-mounted electrical junction box, and wherein the mounting plate is adapted to be engaged by a canopy so as to be in predetermined selective orientations therewith and facilitate aligning of canopy mounting holes with the junction box in a simple and easy manner.

The utilization of exit signs which may consist of essentially rectangular box-like structures having housings with exit legends illuminated by lighting fixtures arranged in canopies interiorly of the exit sign is well known and widely employed in the particular technology. In accordance with specific demands, exit signs may be mounted on walls, wherein the rear surface or back wall of the exit sign back cover is adapted to be located in surface contact with the wall and fastened to a wall-mounted junction box, ordinarily through the intermediary of screws or other suitable fastening devices, and with electrical wires or conduits extending from the junction box to the illuminating elements which are arranged within an exit sign. Alternatively, the exit sign may also be side mounted or top mounted and; for example, suspended from a ceiling or extending outwardly at a generally angular orientation from a wall; for instance, such as at a right angle thereto.

Ordinarily, the back wall of the back cover of an exit sign housing when adapted to be essentially flush-mounted to a standard wall-mounted electrical junction box necessitates that a customer must push or punch out so-called "knock-outs" formed in the back cover by means of suitable weakening lines, and which initially cover one or more potential holes which must align with mounting holes formed in the electrical junction box to facilitate the passage therethrough of fastening elements. This particular type of assembling procedure for the components is extremely time-consuming, and is at times difficult to implement even by experienced electricians or sign installers. Furthermore, in some instances, complicated mounting structure must be attached to an exit sign housing or the like, in which an exit sign canopy bracket structure is designed to be attached to an electrical junction box mounting plate and thereafter affixed thereto through the intermediary of suitable fastener devices.

The foregoing types of exit sign structures and arrangements for mounting such exit signs to junction boxes, and for readily positioning the canopy on the exit sign housing, particularly when mounting the exit sign to a standard wall-mounted electrical junction box in which the back cover of the exit sign is adapted to be essentially flush with or closely extend against the wall surface having the junction box mounted therein, has heretofore been either difficult to install, or requires structural components which are complex in nature and expensive to manufacture.

2. Discussion of the Prior Art

Johnstone, U.S. Pat. No. 5,272,605 discloses an exit sign incorporating a device comprising a canopy mounting bracket wherein, particularly for top mounting of the exit sign, the canopy bracket is temporarily fastened to an electric box mounting plate for a wall-mounted or ceiling mounted electrical junction box. Resilient or spring capture barb members on the canopy mounting bracket are engaged with the mounting plate for a junction box in order to provide at least the temporary fastening prior to the exit sign and canopy being permanently attached to the junction box. This type of structure can also be applied to side-mounted exit signs; however, it is complex in nature and difficult to align the canopy and junction box, and is not readily adapted for mounting an exit sign flush against a wall having a wall-mounted standard junction box arranged therein.

Teisen-Simony, U.S. Pat. No. 4,813,197 discloses a plate mounting system, such as for sign posting arrangements, wherein the plate elements interengage by means of suitable fastener or connecting elements. There is no disclosure of being able to mount an exit sign to a standard wall-mounted electrical junction box through the intermediary of a detachably mounted back plate fastened to the back cover of the exit sign.

Ruskouski, et al., U.S. Pat. No. 5,416,679 discloses a mounting base assembly which is employed for a lighting device installed in an exit sign. In that instance, a plurality of illuminating elements are arranged in elongate base members within electrical sockets and are constituted of light emitting diodes. Such structure can be employed in any exit sign irrespective as to the type of installation thereof, but is not concerned with the mounting of self-aligning canopies.

Lee, U.S. Pat. No. 4,263,739 discloses a bracket which is attached to the end edge of an exit sign which is adapted to extend from a wall or ceiling, and which provides a tamper-proof connection to a junction box installed within the wall. As in the above-mentioned patents, there is no disclosure of a self-aligning canopy structure which is attachable to a wall-mounted junction box.

SUMMARY OF THE INVENTION

Accordingly, in order to improve upon the concepts and aspects of mounting an exit sign on a wall, particularly to facilitate alignment thereof with a standard wall-mounted electrical junction box, and to concurrently facilitate the attaching of a canopy to the junction box in a self-aligning manner, pursuant to the present invention, a back cover for the exit sign housing includes a large circular aperture having a rim-like surface portion extending thereabout which includes clip-type latching elements arranged diagonally opposite each other adjacent the edge of the circular aperture. In order to provide for the simple attachment of the back cover of the exit sign housing to the wall-mounted electrical junction box, there is provided a round junction box mounting plate which includes radially outwardly extending annular flange portions each equipped with snap-like latching elements adapted to engage in openings formed in the clip-type elements on the back cover response to being rotated through a small rotational angle, whereby the junction mounting plate will be fixedly engaged and locked on the back cover. The junction box mounting plate is provided with suitable slot structures disposed so as to be able be engaged by through-extending projections or protruding tongues formed on a canopy, wherein the canopy is mounted so as to be in a self-aligning mode with respect to mounting hole provided in the electrical junction box. The canopy can be mounted in different angularly rotated orientations so as to be either parallel to or perpendicular to a wall containing or mounting the electrical junction box.

The junction box mounting plate may possess a central opening for passage thereto of electrical wiring extending into and through the canopy for the illumination elements within the exit sign from the electrical junction box which is mounted in the wall, and is provided with junction box mounting holes dispersed about the perimeter of the mounting plate which are adapted to be in alignment with mounting holes in the electrical junction box such that screws or similar fasteners can extend therethrough for attaching the junction mounting plate and the back cover of the exit sign which is fastened thereto to the electrical junction box.

The structure and functioning of the mounting and fastening structure for mounting the junction box mounting plate on the back cover of the exit sign and thereafter to the junction box is also described in applicants' copending application Ser. No. 09/124,781 (Attorney Docket 740-133 US; 11060), the disclosure of which is incorporated herein by reference.

When it is desired to have the exit sign either side mounted or top mounted; in essence, when no electrical junction box mounted in a wall is adapted to have the sign mounted in a flush relationship thereon, but rather in which the exit sign is adapted to extend outwardly from a wall or ceiling, instead of attaching a junction box mounting plate to the back cover, there is provided a similarly shaped but essentially blank plate which does not possess any openings for the passage therethrough of electrical wiring, junction box mounting holes or canopy mounting structure. In this instance, the cooperating clip-like latching elements on the back cover and the snap-like latching elements on the blank plate will merely fastened the blank plate to the back cover so as to form a closure for the aperture in the back cover.

Accordingly, it is an object of the present invention to provide a novel mounting plate arrangement for attaching the back cover of an exit sign to a standard wall-mounted electrical junction box, and which incorporates a means for engaging and attaching the canopy structure and to facilitate aligning the canopy with mounting holes in the junction box mounting plate.

Another object of the invention resides in the provision of a junction box mounting plate which is adapted to be mounted so as to extend over a large central aperture formed in the back wall of a back cover for an exit sign housing, and wherein interengageable latching elements fasten a canopy for illumination elements to the junction box mounting plate in predetermined relationship so as to align mounting holes in the canopy with mounting holes of the junction box.

A more specific object of the invention resides in the provision of a junction box mounting plate of the type described which is adapted to be fastened to an exit sign back cover to extend over a large central aperture formed in the wall of the back cover, and wherein the junction box mounting plate includes slots formed therein which will facilitate the insertion therethrough of projections or tongues formed on a canopy so as to align the canopy with mounting holes in the junction box and enabling the canopy to be mounted in selective orientations relative to the junction box.

BRIEF DESCRIPTION OF THE DRAWINGS

Reference may now be had to the following detailed description of a preferred embodiment of the invention, taken in conjunction with the accompanying drawings; in which.

DETAILED DESCRIPTION OF A PREFERRED EMBODIMENT

Figure 1:
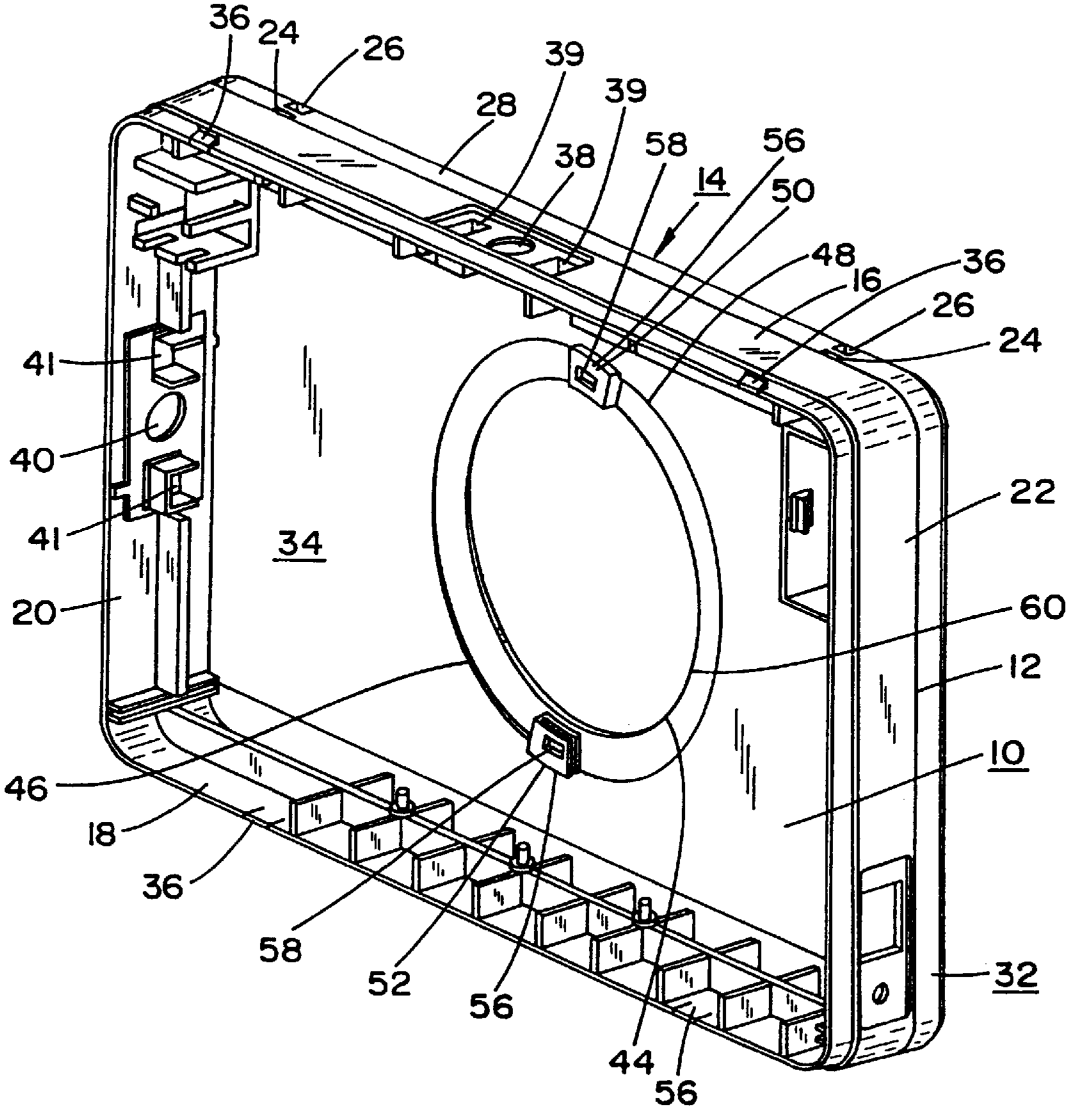
FIG. 1 illustrates a perspective front and side view of the back cover and housing frame of an exit sign in accordance with the present pursuant to the invention.
Figure 2:
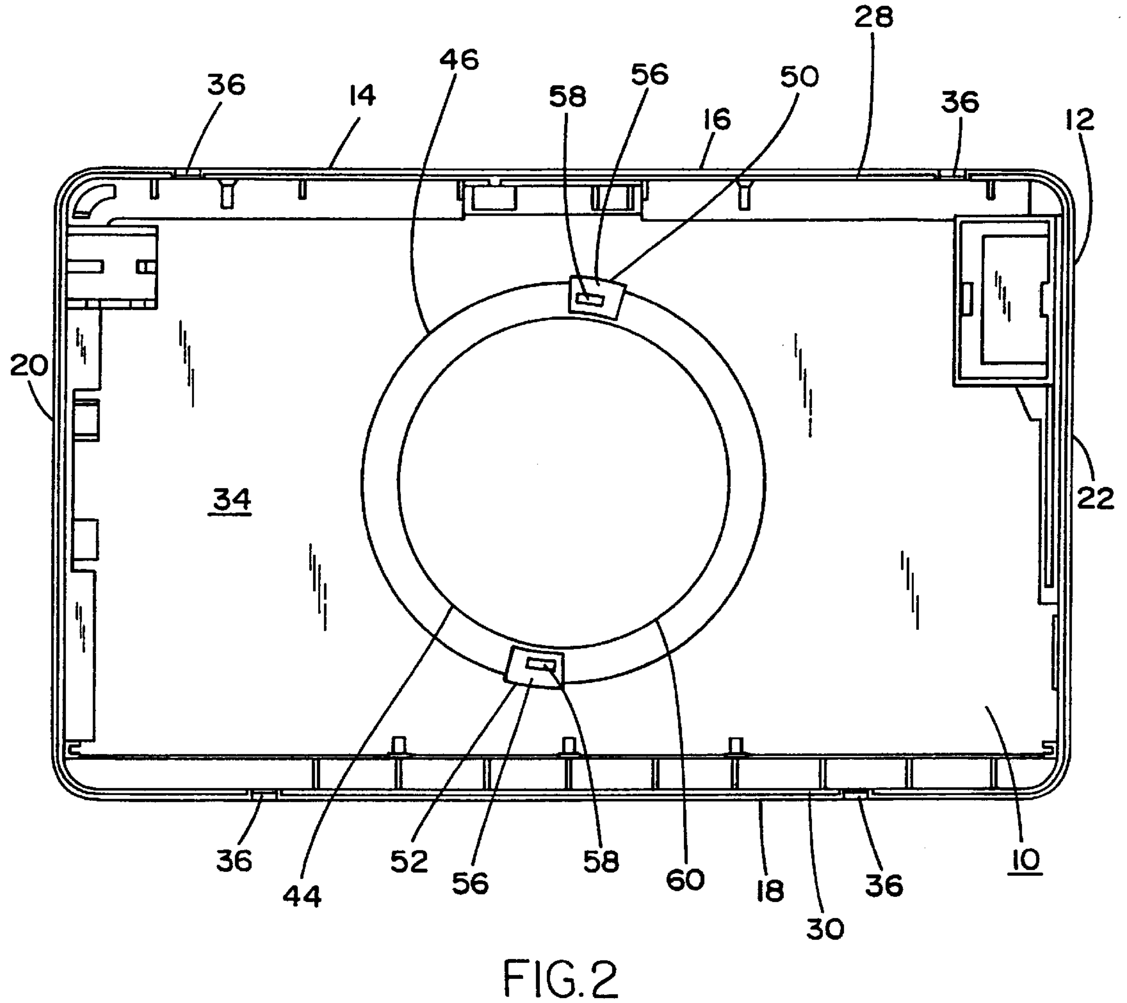
FIG. 2 illustrates a front view of the back cover and housing frame of FIG. 1.
Figure 3:
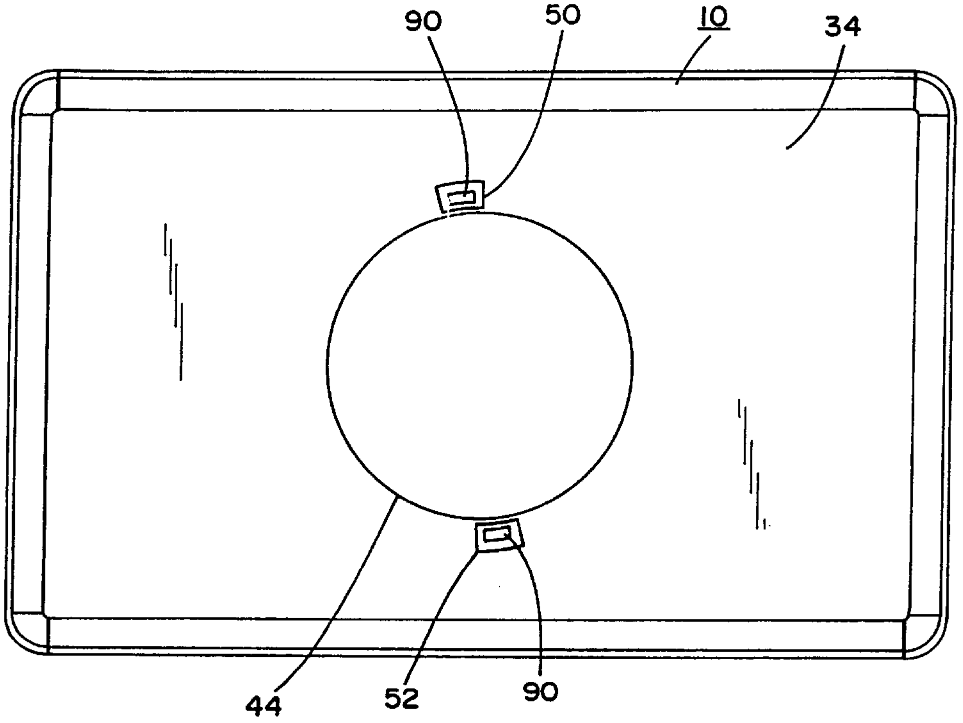
FIG. 3 illustrates a rear view of the back cover and housing frame of the exit sign of FIG. 1.

Referring now in particular to FIGS. 1 to 3, there is disclosed the back cover 10 and housing frame 12 of an exit sign 14. The housing frame is of an essentially rectangular peripheral configuration having upper and lower walls 16 and 18, and side walls 20 and 22 so as to form an encompassing exit sign frame structure, as is well known in the art. The housing frame 12 includes latching elements 24 adapted to engage complementary latching elements 26 on the upper and lower flange structures 28, 30 forming parts of the peripheral ledge 32 of the back cover 10. The back wall 34 of the back cover 10 is of an essentially flat or planar configuration.

The housing frame 12 may also be provided with suitable latching structures 36 at the forward edges of the upper and lower walls 16, 18 for latching engagement with a front cover (not shown) of the exit sign 14. Furthermore, suitable apertures 38 and 39 may be formed in the upper housing wall 16 and apertures 40 and 41 in the one housing side wall 20 which, as may be required, will enable the exit sign 14 to be, respectively, either top-mounted or side-mounted; in essence, mounted either suspended from a ceiling or extending outwardly from a wall surface. This type of exit sign mounting is known in the technology, having reference to the above-mentioned U.S. Pat. No. 5,272,605.

In the present instance, in order to facilitate the mounting of the back cover 10 on a standard wall-mounted electrical junction box (not shown) which is normally mounted flush with or recessed within a wall, rather than providing so-called "knockouts" which have been heretofore incorporated in the back covers, and which must be punched or pushed out to form openings in alignment with mounting arrangements in the junction box, which is difficult to implement, pursuant to the invention, the back wall 34 of the back cover 10 is provided with a large centrally located round aperture 44. Extending about the aperture 44 is an annular recessed surface portion 46 in the interior surface 48 of the back wall 34, and mounting latching elements 50, 52 for the attachment of a junction box mounting plate 54, as described in detail hereinbelow.

The latching elements 50, 52 are arranged diametrically opposite each other on the surface of the annular recessed surface portion 46 adjacent the circumference of the round aperture 44. Each latching element comprises an essentially C-shaped clip with the open end of each clip facing along the circumference, and in which the outer leg portion 56 of each latching element clip including a through-opening 58 for engaging a complementary latching element on the junction box mounting plate 54.

Figure 4:
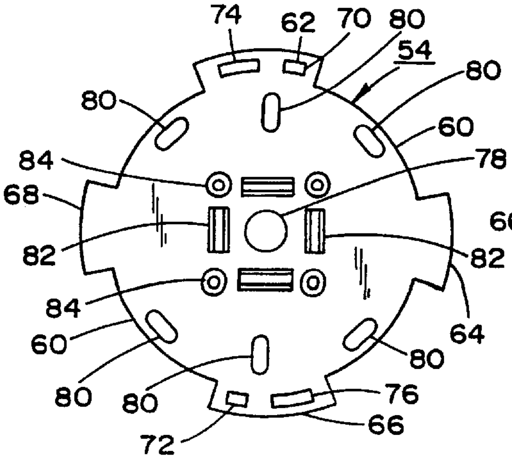
FIG. 4 illustrates a front view of a junction box mounting plate pursuant to the invention which is adapted to be mounted on the back cover of the exit sign.
Figure 6:
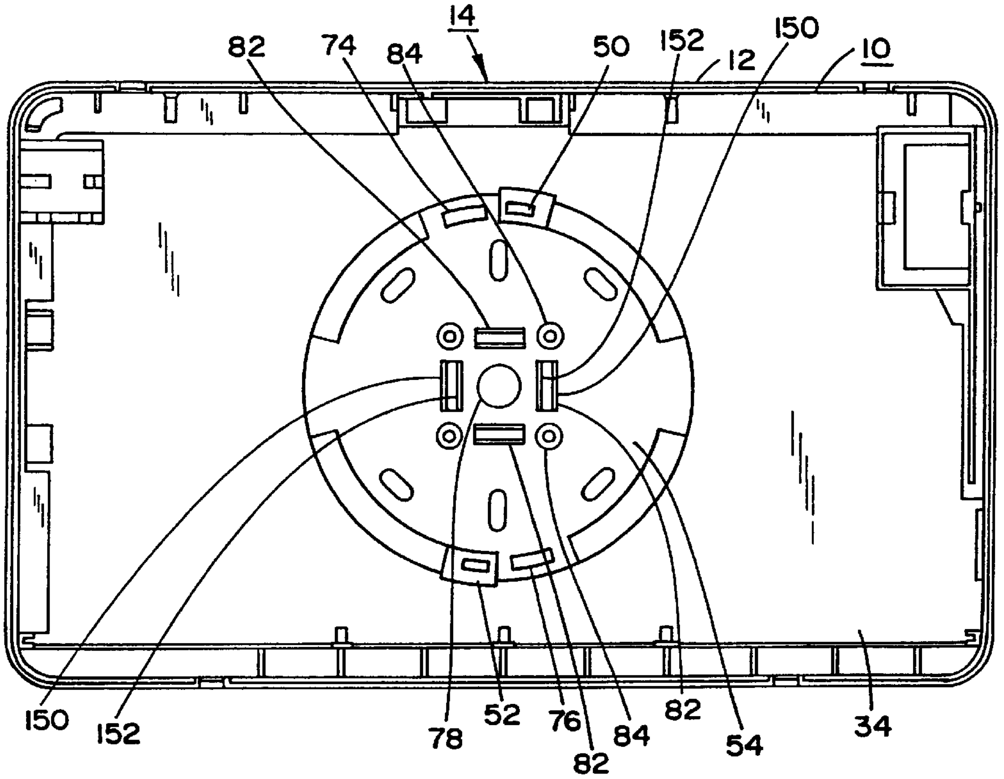
FIG. 6 illustrates a front view of the back cover of the exit sign, shown with the junction box mounting plate of FIG. 4 being mounted thereon.
Figure 7:
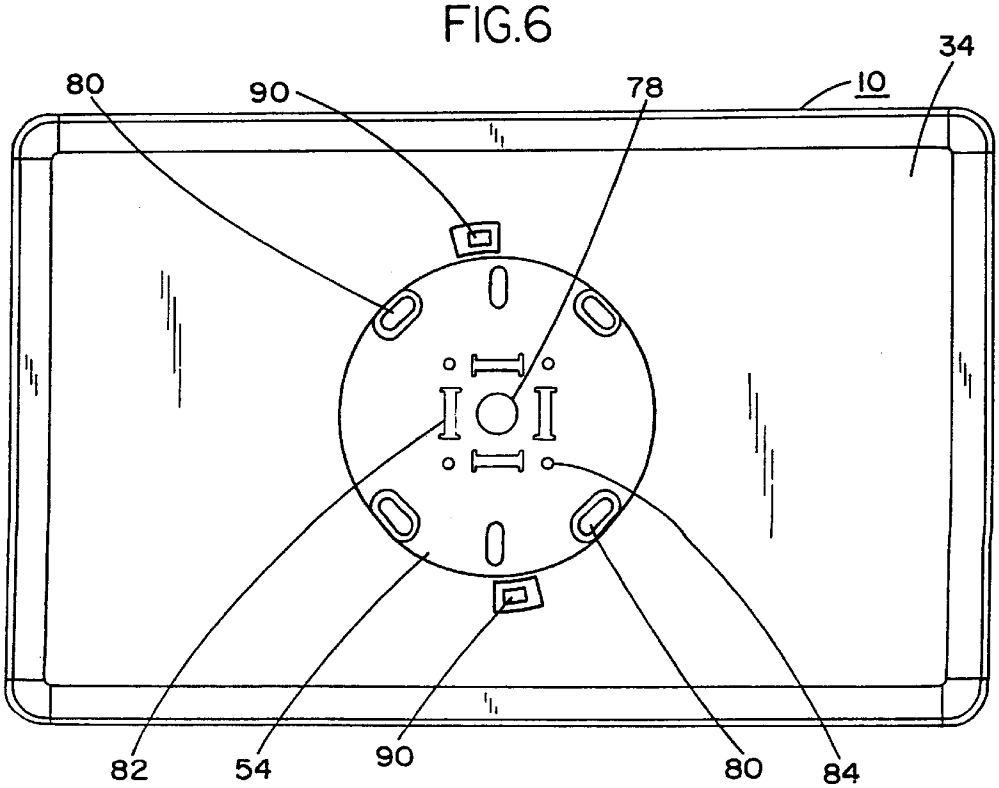
FIG. 7 illustrates a rear view of the arrangement of FIG. 6.
Figure 8:
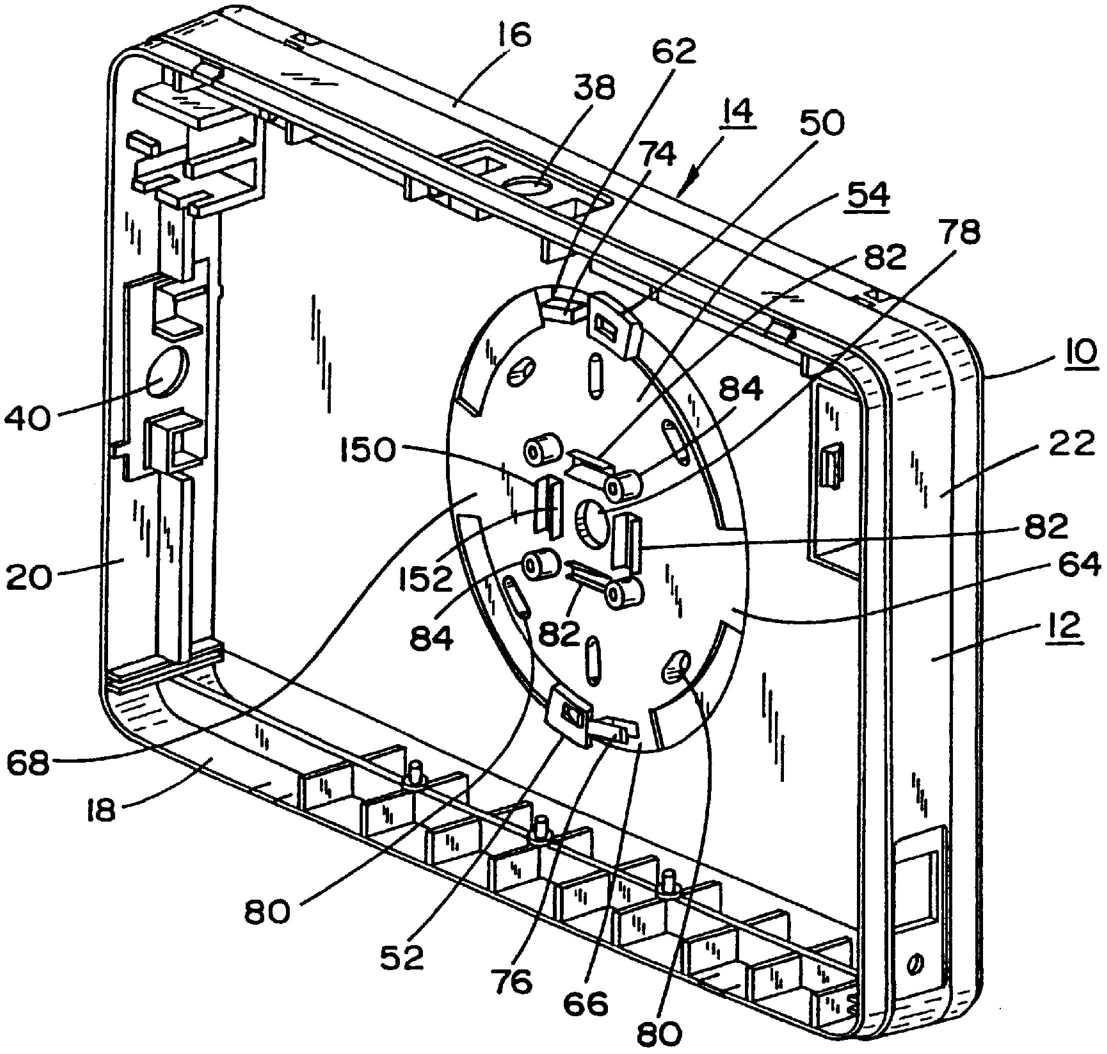
FIG. 8 illustrates a perspective view of the back cover and housing frame for the exit sign as in FIG. 1, shown with the junction box mounting plate of FIG. 4 being positioned thereon and fastened thereto.

When it is intended to mount the exit sign 14 with its back cover 10 flush against or close to a wall, in which the back cover 10 is to be fastened to a standard wall-mounted electrical junction box (not shown), the junction box mounting plate 54, as shown in FIG. 4 of the drawings, is adapted to be fastened to the back cover so as to extend the aperture in the back wall 34 of the back cover 10, as shown in FIGS. 6 through 8 of the drawings.

As illustrated, the outer diameter 60 of the essentially round and flat junction box mounting plate 54 is substantially equal to the diameter of the aperture 44 in the center of the back cover 10, and wherein four (or more) coplanar arcuate tab portions 62, 64, 66 and 68 extend radially outwardly therefrom, each of which subtends a short angular extent and is of a radial width substantially equal to the radial width of the annular recessed surface portion 46 mounting the latching elements 50, 52.

As shown in particular in drawing FIG. 4, two diametrically oppositely located of the tabs 62, 66, which each possess a radial width corresponding essentially to the radial width of the recessed annular surface portion 46 in the back cover 10, each include resilient snap elements 70, 72 extending upwardly therefrom, which when the mounting plate 54 is positioned on the recessed surface portion 46 and rotated within its plane, the snap elements come into latching engagement with the openings 58 in the respective therewith associated clip elements 50, 52 formed on the back cover 10, so as to lock the junction box mounting plate 54 into fixed engagement with the back cover 10 superimposed on aperture 44.

Proximate the snap elements 70, 72 on the radially outward extending tabs 62, 66 of the junction box mounting plate 54 are electrical wire retainer clips 74, 76 which are adapted to engage electrical wires which may be passed through a suitable center hole 78 formed in the junction box mounting plate 54.

Inventively, the junction box mounting plate 54 is provided with a plurality of junction box mounting holes 80, which may each be of an elongate or slotted configuration, and which are suitably spaced about the circumference of the junction box mounting plate 54 so as to allow for the insertion therethrough of suitable fastener elements (not shown) for attaching the plate to an electrical wall-mounted junction box (not shown).

The center region of the junction box mounting plate 54 is also inventively provided with a plurality of inwardly beveled elongate slot structures 82 and canopy mounting bosses 84 arranged about the center hole 78, preferably in a quadrangular arrangement; i.e. four of the slot structures at right angles to each other, and four of the bosses at the corners between the adjacent slot ends, for the mounting of an exit sign canopy, as is described hereinbelow.

The foregoing arrangement facilitates the easy mounting of the junction box mounting plate 54 of FIG. 4 on the recessed surface portion of the back cover 10 of the exit sign 14 as shown in FIGS. 6 to 8 of the drawings, and eliminates the need for providing knockouts in the back wall of the back cover 10. When it desired to remove the mounting plate 54 from the back cover, pressure may be applied through openings 90 as shown in FIG. 7, so as to disengage the latching elements, and to then rotate the mounting plate 54 opposite to the previous direction of rotation.

Once the exit sign 14 is mounted to the electrical junction box, the latching elements 50, 52 facilitate the back plate being locked into place on the back cover. This prevents the exit sign from being intentionally or accidentally disengaged from the back plate and thus from the electrical junction box. The fasteners through which the junction box mounting plate 54 is mechanically attached to the electrical junction box must first be removed in order to remove the exit sign from the wall.

Figure 5:
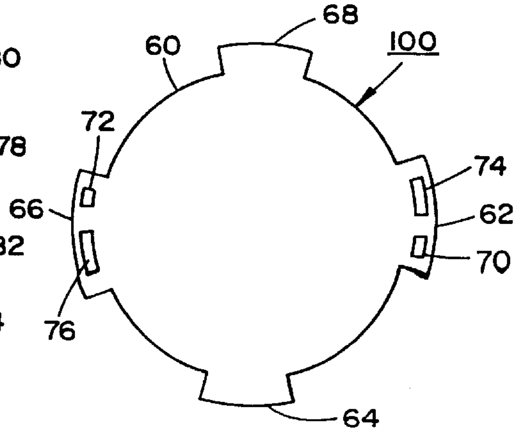
FIG. 5 illustrates a blank mounting plate adapted to be mounted on the back cover instead of the junction box mounting plate of FIG. 4.

In order to mount the exit sign 14 in a side-mounted or top-mounted mode, in which the aperture in the back cover is to be closed in the absence of a junction box behind the back cover 10, instead of the junction box mounting plate 54 of FIG. 4, there is provided a blank mounting plate 100 as shown in FIG. 5. This blank plate has essentially the same overall dimensions and latching elements 70, 72 as does the junction box mounting plate 54; in which elements similar to those in plate 54 are identified by the same reference numerals. The blank plate 100 eliminates all of the previous elements, such as the junction box mounting holes, and any slot arrangements or mounting arrangements for a canopy and the like.

When it is intended to mount the exit sign 14 as a side-mounted or top-mounted unit, the junction box mounting plate 54 with the apertures shown in FIG. 4 may be arranged in conjunction with a canopy for mounting the exit sign to a junction box, whereas the blank mounting plate 100 is positioned in the back cover 10 of the exit sign 14.

Pursuant to another aspect, when it is adapted to provide a double-sided exit sign 14; in effect, viewable from both sides thereof when either side or top-mounted, in that instance, only the junction box mounting plate 54 with the mounting holes as shown in FIG. 4 is employed in conjunction with the canopy. The blank mounting plate 100 as illustrated in FIG. 5 may then be readily discarded by a customer.

Figure 10:
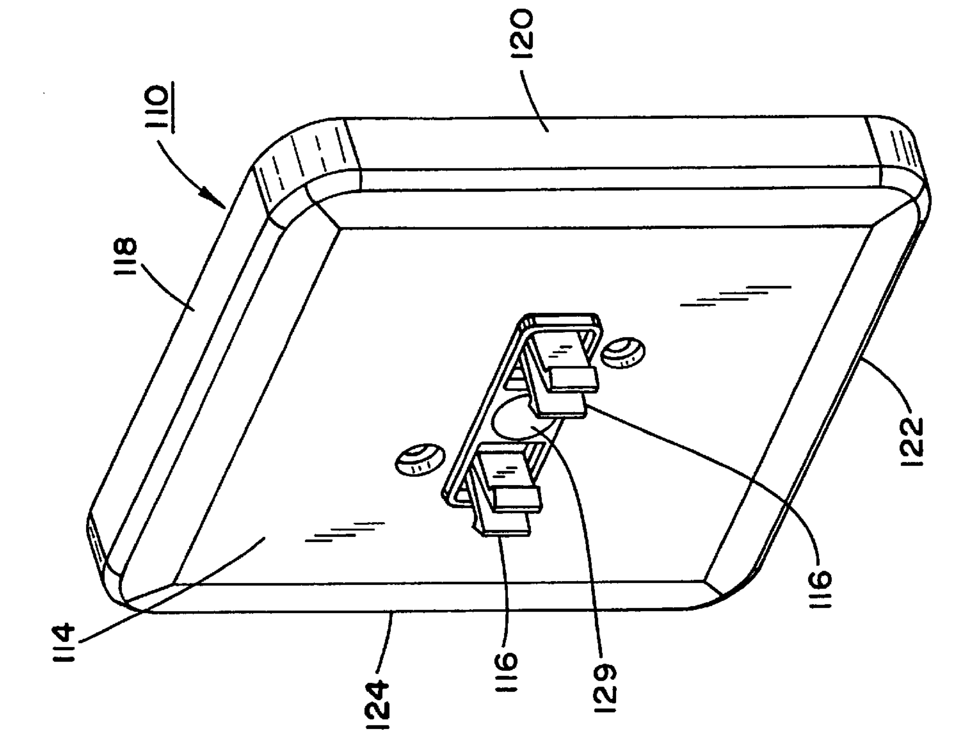
FIG. 10 illustrates a perspective view of the opposite side of the canopy of FIG. 9.
Figure 9:
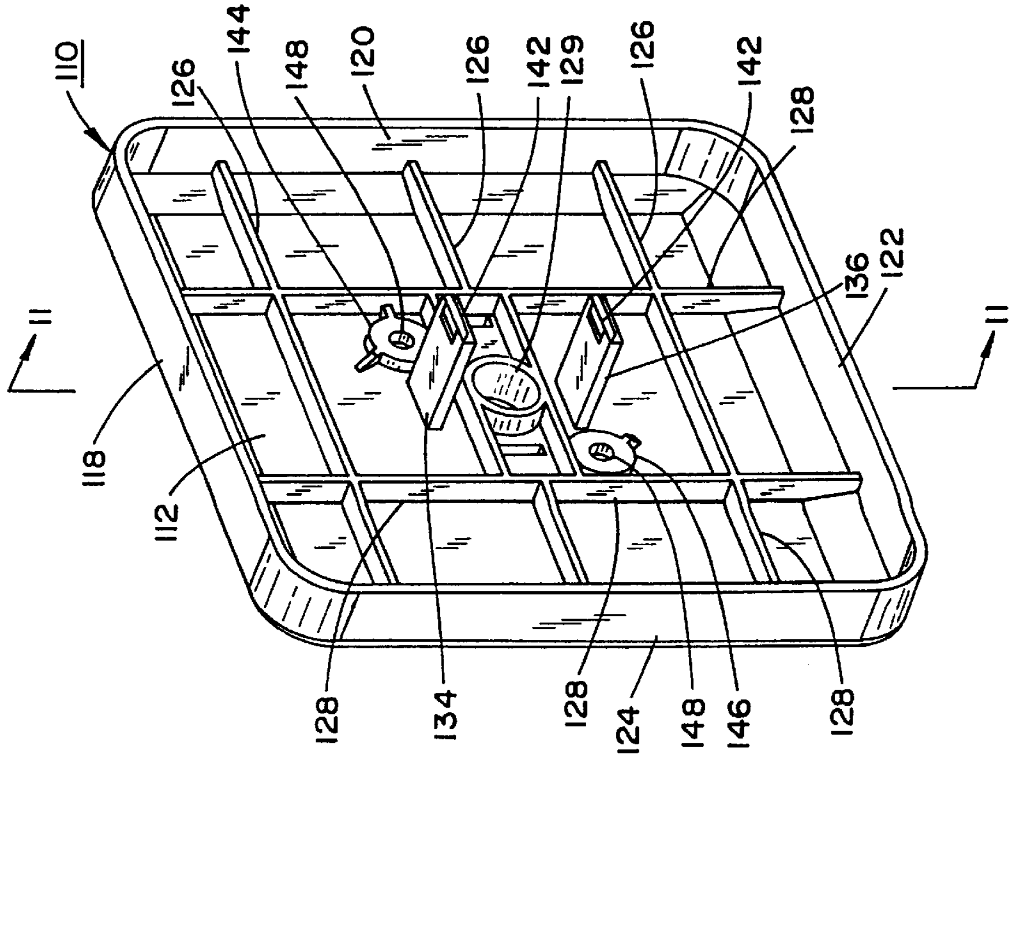
FIG. 9 illustrates a perspective view of the illumination canopy.
Figure 11:
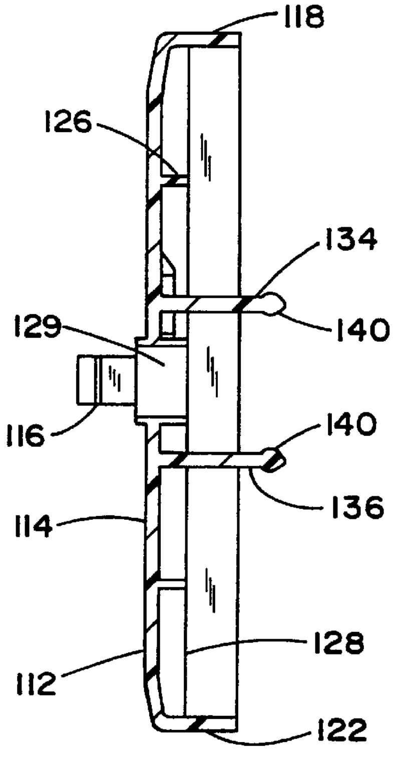
FIG. 11 illustrates a sectional view of the canopy, taken along line 11—11 in FIG. 9.

Reverting to the inventive structure of the canopy 110 which is employed for illuminating elements, as illustrated in the drawing FIGS. 9 through 11, the canopy consists of an essentially rectangular or box-like housing structure having a front wall 112 having a forward surface 114 from which bifurcated projections 116 extend towards the forward portion of the exit sign housing. The canopy 110 in this instance, has a rectangular or square configuration having side walls 118, 120, 122 and 124, and intersecting reinforcing elements 126, 128 extending interiorly thereof. This can be clearly ascertained in the perspective views of FIGS. 9 and 10 and the sectional view of FIG. 11.

The center of the canopy 110 includes an opening 129 for the passage therethrough of electrical wiring which is conveyed from the electrical junction box (not shown) and which wiring also passes through the center hole 78 of the junction mounting plate 54, the latter of which as previously indicated, is adapted to be mounted on the back cover 10 of the exit sign housing.

As can be ascertained in detail from drawing FIGS. 10 and 11, the canopy 110 is provided with a pair of parallel spaced tongue-like protuberances 134, 136 extending from the interior surface 138 of wall 112 rearwardly and outwardly on opposite sides of opening 130. Each protuberances 134, 136 is essentially of a rectangular, flat-like configuration in transverse cross-section, and has a tapered pointy or arrowhead-shaped leading edge 140 in cross-section. On opposite sides of the flat surfaces of each protuberances 134, 136 proximate the free end thereof, there is provided a bead 142 or increased thickness portion extending over a substantial part of the width of the protuberance, for a purpose described hereinbelow.

The interior of the canopy 110, at diagonally opposite edges of the respective parallel spaced protuberances 134, 136 includes upstanding bosses or pads 144, 146 each having a central through-hole 148 for the insertion therethrough of fastening screws (not shown) for ultimately securing the canopy 110 to the junction box mounting plate 54, via two of the four canopy mounting bosses 84.

As indicated hereinabove, the junction box mounting plate 54 is equipped with four slots 82 each having inwardly tapering opposed surfaces 150, 152 and which are spaced in parallel pairs and at right angle orientation so as to provide the quadrangle arrangement about the center hole 78. The spacing of each pair of slots 82 is in correspondence with the spacing between the parallel extending tongue-like protrusion pairs 134, 136 of the canopy 110, and with the gap between surfaces 150, 152 of each slot 82 being substantially equal to or only slightly larger than the thickness of each of the protuberances, and the length of each slot 82 being substantially equal to or only slightly wider than the width of each of the protuberances on the canopy 110. In essence, a respective pair of parallel spaced slots 82 in the junction box mounting plate 54 is adapted to have inserted therethrough the pair of protuberances 134, 136, such that selectively, through rotation in its plane, the canopy may be mounted in one orientation so as to be parallel to the wall mounting the electrical junction box, or may be rotated 90° about its axis so that the protuberance extend through the other pair of slots 82 formed in the junction box mounting plate 54 at right angle to the first pair of slots 82 so as to have the canopy oriented perpendicular to or in a vertical aligned orientation relative to the wall mounting the electrical junction box, and with the through-holes 148 being in alignment with canopy mounting holes in the mounting plate 54.

When it is desired to mount the canopy 110 to the electrical junction box, the pairs of protuberances 134, 136 are pushed through a respective selected pair of slots 82 in the junction box mounting plate 54, (mounted to an electrical junction box via two (2) of the elongated or slotted mounting holes 80), depending upon the desired orientation of the canopy, whereby the beads or thickened portions 142 at the leading end of each protuberance would be forced through the slots 82 and thereby provide a somewhat latching engagement therebetween, preventing the canopy 110 from being retracted unless a strong pulling action is applied to the canopy. The orientation of the slots 82 relative to mounting holes for the canopy 110 in the electrical junction box is adapted to provide a substantially precise alignment of the bosses 144, 146 in the canopy with the bosses 84 provided proximate each corner location between adjacent right angled pairs of slots 82 in the junction box mounting plate 54 whereby it will become easy to readily pass suitable fasteners or screws therethrough so as to fixedly and in alignment connect the canopy 110 with the electrical junction box via the junction box mounting plate. This particular arrangement will permit the canopy to be mounted relatively quickly and simply by the installer, inasmuch as the required alignment between the components is inherent in the provision of the respective slots 82 in the junction box mounting plate 54 relative to the electrical junction box, and also the positioning of the slots to provide the necessary alignment between the bosses in the canopy 110 and the canopy mounting holes 84 passing through the junction box mounting plate and those provided in the electrical junction box (not shown).

Figure 12:
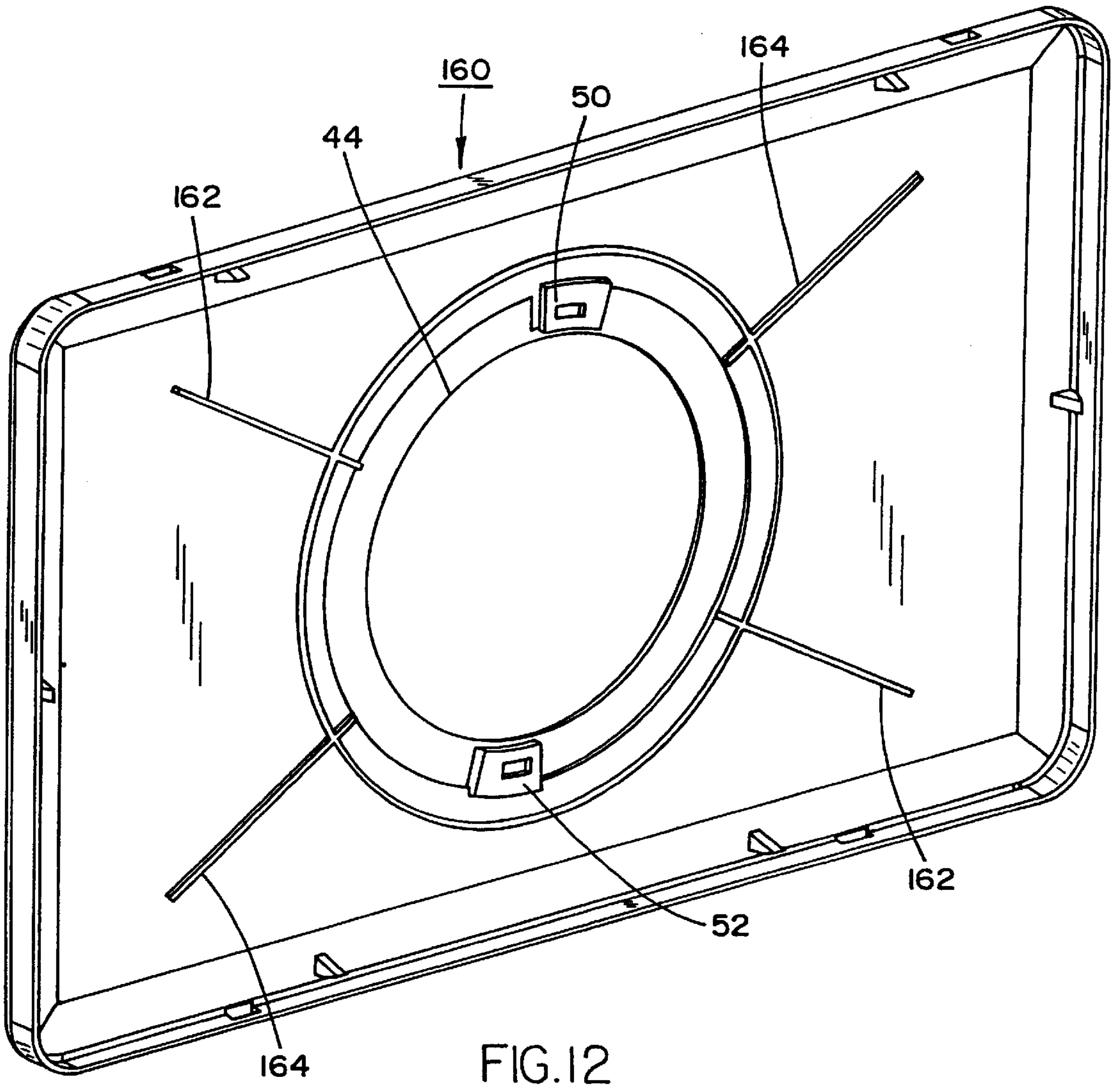
FIG. 12 illustrates a perspective view of a modified back cover.

As can be ascertained from FIG. 12 of the drawings there is provided a somewhat modified back cover 160 for an exit sign in comparison with back cover 10 shown in the preceding embodiment of FIGS. 1 through 8, wherein similar or identical elements are identified by the same reference numerals, and wherein reinforcing molded rib elements 162, 164 are provided interiorly thereof over the surface of the back cover so as to prevent any undue deflection or distortion of the back cover, the latter of which is of a relatively thin-walled construction. This back cover 160 may also be employed in connection with an exit sign incorporating battery power for the illumination elements, and for the remainder is quite similar to the previously disclosed back cover construction.

Figure 13:
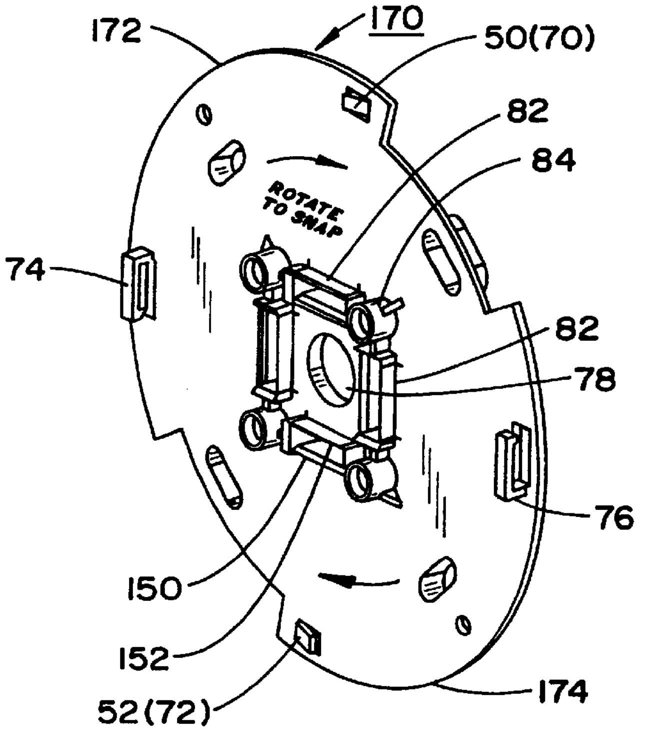
FIGS. 13 and 14 illustrate, respectively, front and back perspective views of a modified junction box mounting plate.
Figure 14:
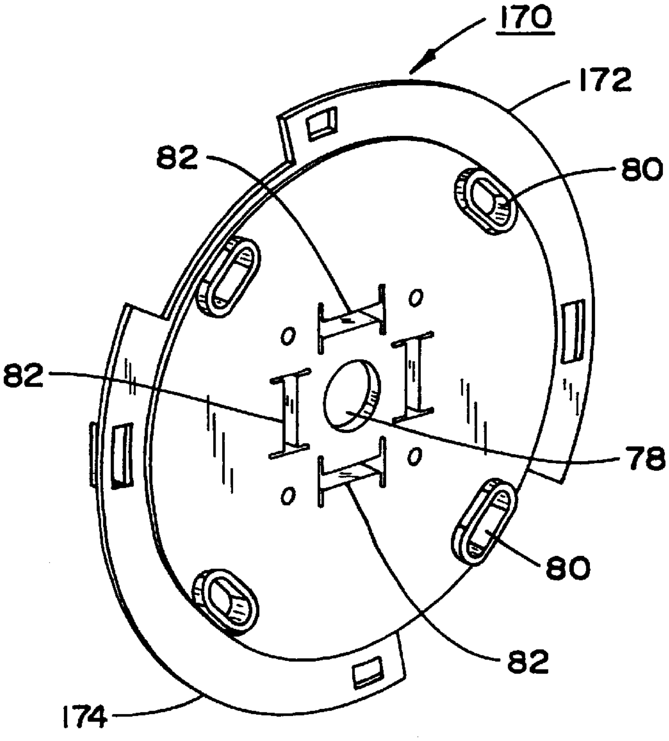

As an alternative to the junction box mounting plate 54 as described with regard to FIGS. 4 and 5, in drawing FIGS. 13 and 14 there are disclosed front end and rear perspective views of a somewhat modified junction box mounting plate 170, in which similar or identical elements as in the plate 54 are identified by the same reference numerals, wherein the flanges 172, 174 which extend radially outwardly from the circumference 60 of the plate 170 are two (2) in number rather than four (4) as previously, and subtend a greater arcuate extent so as to provide a more extensive surface contact with the interior wall of the back cover 160. In this instance, the modified junction box mounting plate 170 also incorporates the two sets or pairs of slots 82 through which the tongue-like protuberances 134, 136 on the canopy 110 are adapted to be pushed through, and possessing four bosses 84 for mounting the canopy, of which two are respectively utilized, depending upon the orientation of the canopy, and which particular pair of slots 82 is employed for aligning the canopy with the electrical junction box.

For the remainder with the exception of the positioning of the slotted junction box mounting holes 180, and their reinforcing structure 182 on the rear of the plate, and positioning of the clips 76 for engaging the wiring, this junction box mounting plate 170 is similar to the mounting plate 54 of the previous embodiment.

Figure 15:
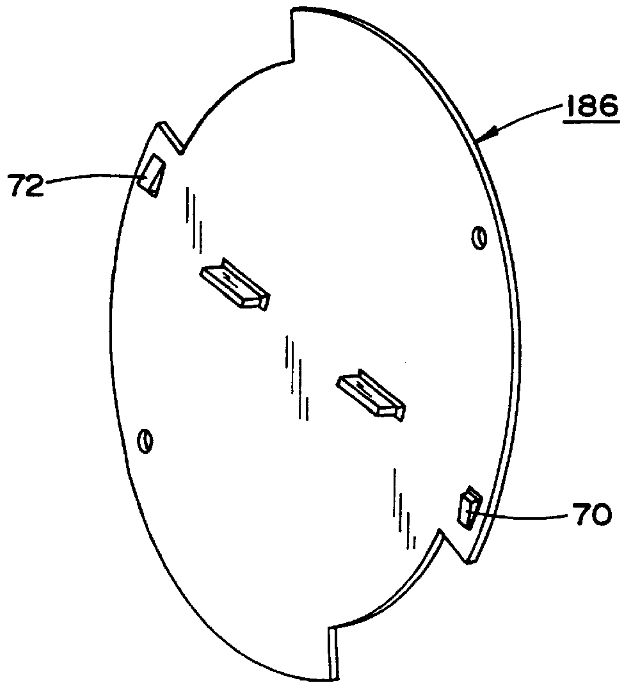
FIG. 15 illustrates a modified blank plate for the back cover.

Moreover, as shown in drawing FIG. 15, there is also shown a blank plate 186 which may be utilized in lieu of the modified junction box mounting plate 170, and which is employed in the same manner as the blank plate 100 of the previous embodiment, the modifications being only primary minor in nature, and the function being essentially the same as in the previous embodiment.

Figure 16:
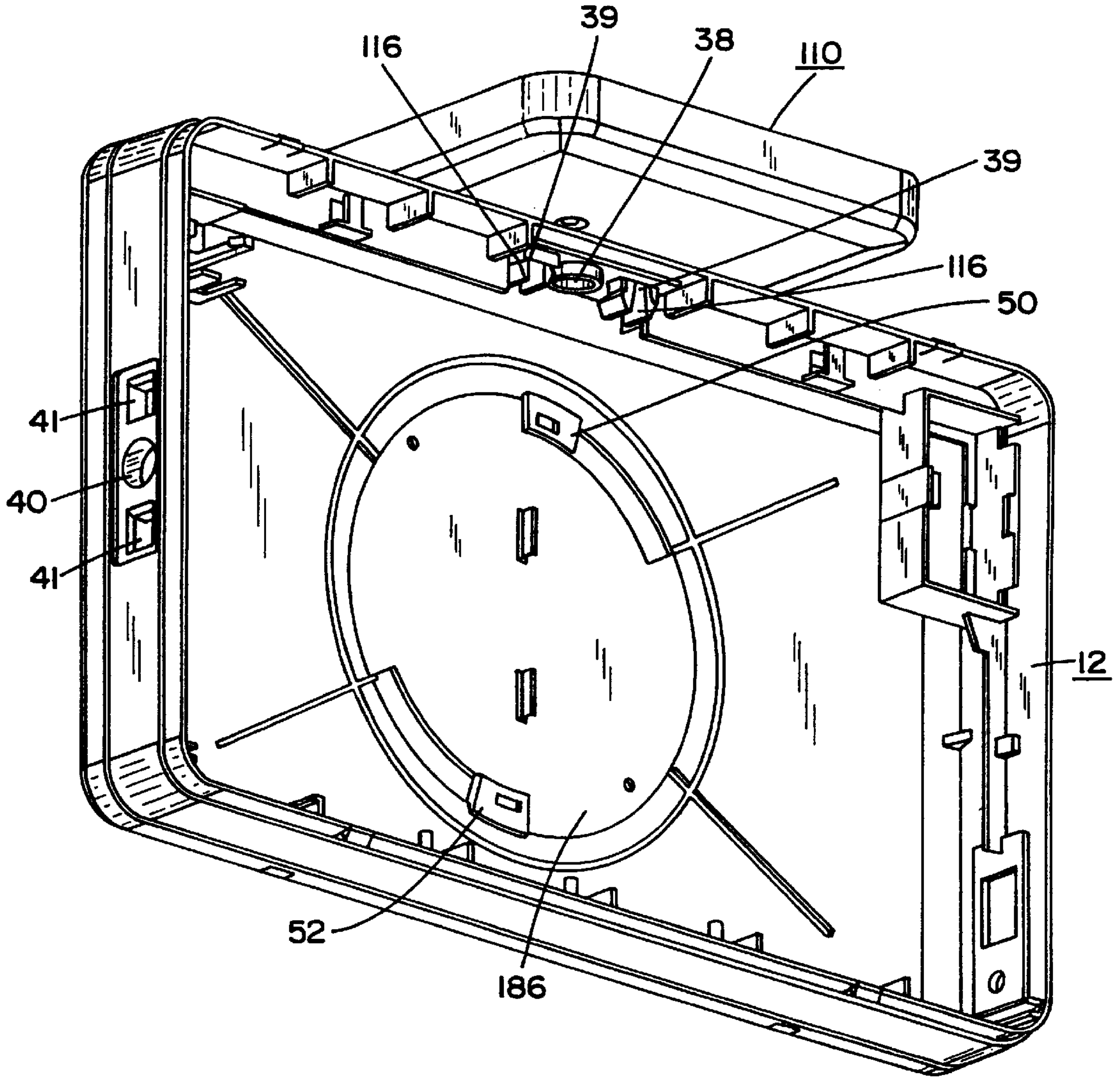
FIG. 16 illustrates a perspective view of an alternate arrangement for attaching the canopy to the exit sign.

Alternatively, pursuant to another aspect, as shown in FIG. 16 of the drawings, the canopy 110 may be attached to the exit sign 14 through the intermediary of locking tabs 116 in the form of the bifurcated projections being inserted though apertures 39 in the housing 12. In that instance, once the back cover (or an additional front cover for a double-sided exit sign) and the front exit sign cover are snapped onto the exit sign housing 12, screws or fasteners which are employed to attach the canopy 110 to the junction box mounting plate, through holes 148, are basically obscured from view. This, resultingly enhances the aesthetic appeal of the exit sign since no mounting screws are visible.

From the foregoing, it becomes readily apparent that the invention is directed to a simple and inexpensive construction for aligning a canopy 110 of an exit sign with a junction box through the intermediary of the inventive junction box mounting plate 54 or 170 which may be engaged by the protuberances 134, 136 in different orientations of the canopy.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. A mounting arrangement for the self-aligning fastening of an illumination canopy for an electrical fixture having a housing and a planar back cover for said housing to an electrical junction box which is located in a wall, said back cover having a centrally located aperture, and latching means arranged about the perimeter of said aperture; said self-aligning canopy mounting arrangement comprising:

(a) a plate member positionable over said aperture, latching elements on said plate member for engaging said latching means so as to fasten said plate member to the back cover, said plate member including a center opening for the passage therethrough of electrical wiring extending from the electrical junction box; means on said plate member for mounting a canopy thereon in predetermined relationship with a junction box; and a plurality of holes extending through said plate member at predetermined locations to facilitate insertion therethrough of fasteners for mounting said plate member to said electrical junction box whereby the back cover is positioned in closely spaced relationship with said electrical junction box; and (b) an illumination canopy including structure engage able with said canopy mounting means on said plate member for positioning said canopy on said plate member in alignment with canopy attaching structure in a junction box, said canopy mounting means on said plate member comprising a plurality of spaced slots located about the center opening in said plate member; said canopy mounting structure comprising latch-forming protuberances on said canopy latchably engageable into at least some of said slots for fastening said canopy to said plate member in a specified orientation relative thereto.

2. A mounting arrangement as claimed in claim 1, wherein said slots comprise two pairs of said slots arranged at right angles to form a quadrangle about said center opening in said plate member, said protuberances on said canopy engaging being selectively engageable into one pair of said slots.

3. A mounting arrangement as claimed in claim 2, wherein apertured bosses are formed in said plate member proximate the ends of adjacent of said slots, and apertures are formed in said canopy proximate said protuberances for the passage therethrough of fasteners for connecting said canopy with a junction box.

4. A mounting arrangement as claimed in claim 2, wherein said protuberances on said canopy comprise a pair of parallel spaced tongue-shaped elements, each said pair of slots in said plate member extending in parallel spaced relationship so as to engage able by said tongue-shaped elements.

5. A mounting arrangement as claimed in claim 4, wherein each said slot has inwardly tapered surfaces to facilitate insertion of said tongue-shaped elements therethrough.

6. A mounting arrangement as claimed in claim 5, wherein each said tongue-shaped element has a raised bead formed at the leading end thereof to restrain said canopy from being pulled out of said plate member.

7. A mounting arrangement as claimed in claim 4, wherein said canopy is mountable on said plate member in different aligned orientations relative to a junction box.

8. A mounting arrangement as claimed in claim 2, wherein said illumination canopy comprises a rectangular housing having a front wall, said protuberances extending from the rear surface of said front wall.

9. A mounting arrangement as claimed in claim 1, wherein said aperture in said back cover is circular, a recessed annular surface portion within said back cover extending about said aperture, and said latching means comprising resilient clip elements extending from said recessed annular surface portion and being located diametrically opposite each other.

10. A mounting arrangement as claimed in claim 9, wherein said plate member comprises a circular plate having a diameter substantially the size of the diameter of said aperture, and including a plurality of radially outwardly extending coplanar flange portions spaced about the circumference of said plate member so as to be positioned in surface contact with said recessed annular surface portion in the back cover.

11. A mounting arrangement as claimed in claim 10, wherein said latching elements on said plate member comprise diametrically oppositely located resilient snap elements adapted to latchingly engage into said clip elements for securing and locking said plate member to the inner surface of said back cover.

12. A mounting arrangement as claimed in claim 11, wherein said clip elements include openings for latchingly receiving said resilient snap elements on said plate member.

13. A mounting arrangement as claimed in claim 10, wherein said latching elements on said plate member are located on at least some of the flange portions of said plate member.

14. A mounting arrangement as claimed in claim 9, wherein said latching means on said back cover and the latching elements on said plate member are releasably engage able for the detaching of said plate member from said electrical fixture.

15. A mounting arrangement as claimed in claim 9, wherein said plate member comprises a blank mounting plate without holes therein for closing the aperture in said back cover, said blank mounting plate being a replacement for said electrical junction box mounting plate member when the electrical fixture is intended to be side-mounted or top-mounted.

16. A mounting arrangement as claimed in claim 9, wherein said electrical fixture comprises an exit sign.

17. A mounting arrangement as claimed in claim 16, wherein said housing is rectangular in shape, said back cover having a planar back wall and said aperture being formed in the center of said back wall.

18. A mounting arrangement as claimed in claim 9, wherein said plurality of holes in said plate member each comprises an elongate slotted hole to facilitate alignment thereof with fastening structure in a wall-mounted electrical junction box.

* * * * *